United States Patent [19]
Enomoto et al.

[11] Patent Number: 5,310,865
[45] Date of Patent: May 10, 1994

[54] POLYHYDROXYCARBOXYLIC ACID AND PREPARATION PROCESS THEREOF

[75] Inventors: Katashi Enomoto; Masanobu Ajioka; Akihiro Yamaguchi, all of Kanagawa, Japan

[73] Assignee: Mitsui Toatsu Chemicals, Incorporated, Tokyo, Japan

[21] Appl. No.: 992,696

[22] Filed: Dec. 18, 1992

[30] Foreign Application Priority Data

Dec. 18, 1991 [JP] Japan ............................ 3-336820
Jun. 16, 1992 [JP] Japan ............................ 4-156526

[51] Int. Cl.⁵ .............................................. C08G 63/06
[52] U.S. Cl. ................................. 528/361; 528/354; 528/357
[58] Field of Search ......................... 528/354, 357, 361

[56] References Cited

U.S. PATENT DOCUMENTS

| | | | |
|---|---|---|---|
| 2,703,316 | 3/1955 | Schneider | 528/361 |
| 2,758,987 | 8/1956 | Saizberg | 528/361 |
| 4,273,920 | 6/1981 | Nevin | 528/36 |
| 5,180,765 | 1/1993 | Sinclair | 528/361 |
| 5,206,341 | 4/1993 | Ibay et al. | 528/361 |

FOREIGN PATENT DOCUMENTS 59-96123  6/1984  Japan.

*Primary Examiner*—John Kight, III
*Assistant Examiner*—Shelley A. Dodson
*Attorney, Agent, or Firm*—Burns, Doane, Swecker & Mathis

[57] ABSTRACT

A process for preparing polyhydroxycarboxylic acid by conducting a dehydration condensation of a hydroxycarboxylic acid or an oligomer thereof in a reaction mixture containing an organic solvent substantially in the absence of water and the polyhydroxycarboxylic acid thus obtained. The process provides polyhydroxycarboxylic acid having excellent properties and processability.

37 Claims, 4 Drawing Sheets

Chemical shift (ppm)

POLYHYDROXYCARBOXYLIC ACID AND PREPARATION PROCESS THEREOF

BACKGROUND OF THE INVENTION

1) Field of the Invention

The present invention relates to a polyhydroxycarboxylic acid which is a useful biodegradable polymer as a substitute for medical materials or general purpose resins and a process for preparing the polyhydroxycarboxylic acid directly from hydroxycarboxylic acid by dehydration condensation. Hydroxycarboxylic acid, particularly lactic acid, is widely distributed in the natural world and is harmless to animals, plants, men and beasts. Polylactic acid which is a polymer of the lactic acid can be hydrolyzed with relative ease in the presence of water and is also hydrolyzed and absorbed in vivo. Thus polylactic acid has attracted attention as a polymer which can be applied to the above uses.

2) Description of the Related Art

Polylactic acid or polyglycolic acid which is a polyhydroxycarboxylic acid has been generally prepared by ring opening polymerization of lactide or glycolide which is a cyclic dimer of lactic acid or glycolic acid.

U.S. Pat. No. 2,703,316 has disclosed a preparation process of poly-D,L-lactic acid. D,L-lactic acid is initially converted to an oligomer, lactide is isolated at 200°~250° C. under reduced pressure and successively recrystallized a few times from ethyl acetate. Racemilactide thus obtained has a melting point of 120° C. or above and can be converted to poly-D,L-lactic acid by ring-opening polymerization. Poly-D,L-lactic acid obtained has an inherent viscosity ($\eta$) of 0.45 dl/g or more and can be processed into a tough film or monofilament. It has also been described that the polymer obtained by direct condensation of lactic acid is brittle and cannot be stretched.

U.S. Pat. No. 2,758,987 has described a preparation process of poly-L-lactic acid having an inherent viscosity ($\eta$) of 0.4 dl/g or more from L,L-lactide which is obtained in the same manner from L-lactic acid and has a melting point of 94° C. or above.

However, preparation of lactide or glycolide which is suited for a material of polymer requires much labor and expenses such as distillation and recrystallization and is unfavorable from an economic standpoint. The process cannot be carried out in the case of copolymerizing hydroxycarboxylic acid which does not form acyclic lactone such as lactide or glycolide.

On the other hand, a direct polycondensation of hydroxycarboxylic acid such as lactic acid and glycolic acid is a successive reaction similarly to an esterification reaction of dibasic acid and polyhydric alcohol. Molecular weight of the product increases with reaction time. Since generated water acts to reduce the molecular weight of the polycondensate through hydrolysis it has been required to remove generated water out of the reaction system in order to obtain high molecular weight polyhydroxycarboxylic acid such as polylactic acid or polyglycolic acid.

Japanese Laid-Open Patent SHO 59-96,123 has disclosed a process for preparing polylactic acid having a molecular weight of 4,000 or more by carrying out a condensation reaction at temperature of 220°~260° C. under reduced pressure of 10 mmHg or less in the absence of a catalyst.

U.S. Pat. No. 4,273,920 has disclosed a copolymer of lactic acid and glycolic acid obtained by conducting dehydration condensation in the presence of an ion exchange resin catalyst and successively removing the catalyst. The copolymer contains substantially no catalyst and has an inherent viscosity ($\eta$) of 0.08~0.30 dl/g and an average molecular weight of 6,000~35,000.

However, a high temperature of 180° C. or above is required in order to obtain high molecular weight polymer by the above processes. The polymer obtained under such condition has problems such as discoloration and the presence of impurities formed by decomposition of the polymer. These problems have not yet been solved with polymers having an average molecular weight of 15,000 or more.

The molecular weight range of the polymer obtained by these processes is also restricted and thus a polymer which can exhibit sufficient strength in the form of a film or monofilament cannot be obtained.

SUMMARY OF THE INVENTION

The present invention provides polyhydroxycarboxylic acid directly obtained from hydroxycarboxylic acid by dehydration condensation and a preparation process thereof.

DETAILED DESCRIPTION OF THE INVENTION

Figure 1:
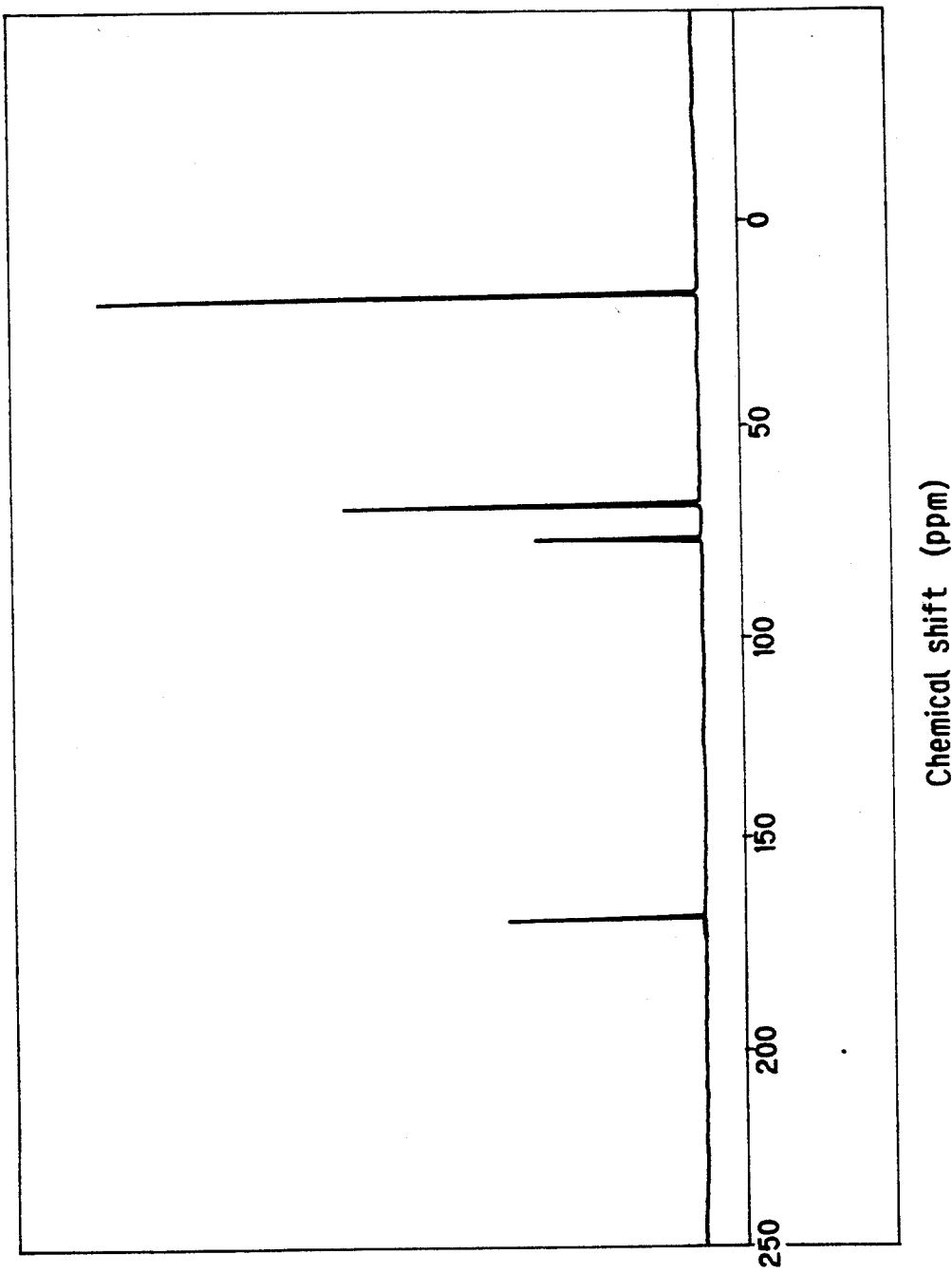
FIG. 1 is an overall diagram of $^{13}$C-NMR spectrum illustrating a random copolymer obtained in Example 32 and derived from 90% of L-lactic acid and 10% of D-lactic acid.

Accordingly, one aspect of the invention is a preparation process of polyhydroxycarboxylic acid comprising conducting condensation of hydroxycarboxylic acid or an oligomer thereof in an organic solvent substantially in the absence of water to obtain a polyhydroxycarboxylic acid having an average molecular weight of 50,000 or more, an inherent viscosity ($\eta$) of 0.40 dl/g or more, at least 5 absorption bands at around 169.27, 169.31, 169.42, 169.49 and 169.66 ppm in a $^{13}$C-NMR spectrum, and consisting of D-lactic acid units and L-lactic acid units.

The average molecular weight (MW) of the polyhydroxycarboxylic acid of the present invention is measured by gel permeation chromatography (column temperature of 40° C., chloroform solvent) with reference to a polystyrene standard sample.

The inherent viscosity ($\eta$) of polyhydroxycarboxylic acid in the invention is measured with an Ubbelohde viscometer in a solution containing 0.1 g of polyhydroxycarboxylic acid in 100 ml of methylene chloride and calculated from the following equation:

$$\eta = \ln(t/t_0)/C$$

where t is an efflux time of the solution, $t_0$ is an efflux time of the solvent, and d is a concentration in g/10 dl of the solution.

The preparation process of the invention is characterized by conducting a heat-dehydrating condensation reaction of hydroxycarboxylic acid in an organic solvent and azeotropically distilling generated water with the organic solvent out of the reaction system. Simultaneously, an organic solvent having a water content equal to or less than the solubility of water in the solvent is charged to the reaction system as an additional solvent while carrying out the reaction.

Exemplary organic solvents which can be used for the preparation process of the invention include hydrocarbon solvents such as toluene, xylene and mesitylene; halogenated hydrocarbon solvents such as chlorobenzene, bromobenzene, iodobenzene, dichlorobenzene, 1,1,2,2,-tetrachloroethane and p-chlorotoluene; ketone solvents such as 3-hexanone, acetophenone and benzophenone; ether solvents such as dibutyl ether, anisole, phenetole, o-dimethoxybenzene, p-dimethoxybenzene, 3-methoxytoluene, dibenzyl ether, benzyl phenyl ether and methoxynaphthalene; thioether solvents such as phenyl sulfide and thioanisole; ester solvents such as methyl benzoate, methyl phthalate and ethyl phthalate; diphenyl ether; alkylated diphenyl ether solvents such as 4-methyldiphenyl ether, 3-methyldiphenyl ether and 3-phenoxytoluene; halogenated diphenyl ether solvents such as 4-bromodiphenyl ether, 4-chlorodiphenyl ether and 4-methyl-4'-bromodiphenyl ether; alkoxy diphenyl ether solvents such as 4-methoxydiphenyl ether, 3-methoxydiphenyl ether and 4-methyl-4'-methoxydiphenyl ether; or cyclic diphenyl ether solvents such as dibenzofuran and xanthene. These solvents can be used singly or as a mixture. Solvents which can separate water with ease are preferably used. In order to obtain, in particular, a polyhydroxycarboxylic acid having a high average molecular weight, ether solvents, alkyl aryl ether solvents or diphenyl ether solvents are most preferably used.

These solvents are preferably used in an amount which provides a polymer concentration of 10~80%.

In the preparation process of the invention, generated water is distilled out of the reaction system preferably in the form of an azeotropic mixture with the organic solvent used. When the water content of the azeotropic mixture is higher than the solubility of water in said organic solvent, water is separated from the azeotropic mixture and residual organic solvent can be returned to the reaction system. The residual organic solvent can be further treated with a drying agent in order to remove dissolved water and successively returned to the reaction system.

Alternatively, a new organic solvent having a low water content can be charged to the reaction system in place of the azeotropically distilled organic solvent. Water can also be removed under reduced pressure in the initial stage of the reaction and successively a part of the organic solvent can be removed from the reaction mixture to adjust the water content of the reaction mixture to a prescribed level.

The essential point of the invention is to conduct the condensation reaction while removing generated water.

In the embodiments of the invention, the solvent can or cannot form an azeotropic mixture with water and can or cannot separate water. A method for previously charging an excessive solvent to the reaction system and conducting dehydration simply by distilling the solvent and a method for drying the reaction solvent by using another solvent, are also included in the embodiments. As a further modified method, water can be removed while maintaining the reaction solvent in the liquid state. The reaction of the invention has only to be conducted at the prescribed temperature, even though the boiling point is reduced due to azeotropic distillation of the solvent with water.

The average molecular weight of the polyhydroxycarboxylic acid depends also upon the moisture content of the organic solvent charged to the reaction system and the kind of the solvent. When the solvent has a high water content of 400~500 ppm, the average molecular weight of polyhydroxycarboxylic acid obtained is 15,000~50,000. It is however surprising that a polyhydroxycarboxylic acid having an average molecular weight of 40,000~50,000 can be obtained by using a diphenyl ether-based solvent even in the above high water content of the solvent. In order to obtain a polyhydroxycarboxylic acid having a higher average molecular weight, it is desired to reduce the water content of the organic solvent charged to the reaction system. The azeotropically distilled organic solvent is treated with the drying agent to reduce or eliminate moisture and returned to the reaction system, or a new organic solvent having a low water content is charged to the reaction system.

By such a method, the amount of water charged is reduced to 50 ppm or less and polyhydroxycarboxylic acid having an average molecular weight of 50,000~200,000 can be obtained.

Drying agents which can be used for preparing polyhydroxycarboxylic acid having a high average molecular weight in the preparation process of the invention include, for example, molecular sieve 3A, molecular sieve 4A, molecular sieve 5A, molecular sieve 13X and other molecular sieves, alumina, silica gel, calcium chloride, calcium sulfate, phosphorus pentaoxide, concentrated sulfuric acid, magnesium perchlorate, barium oxide, calcium oxide, potassium hydroxide, sodium hydroxide, metal hydrides such as calcium hydride, sodium hydride and lithium aluminum hydride, or alkali metals such as sodium. In these drying agents, molecular sieves are preferred in view of ease in handling and regeneration.

The reaction temperature in the preparation process of the invention is preferably 80°~200° C., more preferably 110°~170° C. in view of forming and heat-decomposition rates of the polymer. Condensation reaction is usually carried out at the distillation temperature of the organic solvent under normal pressure. When a high boiling organic solvent is used, the reaction can be carried out under reduced pressure in order to maintain the reaction temperature in a preferred range. When a low boiling organic solvent is used, the reaction can be carried out under increased pressure.

Hydroxycarboxylic acid which can be used for the invention is an aliphatic carboxylic acid having a hydroxyl group in the molecule. Exemplary hydroxycarboxylic acids include lactic acid, glycolic acid, 3-hydroxybutyric acid, 4-hydroxybutyric acid, 3- hydroxyvaleric acid, 5-hydroxyvaleric acid or 6-hydroxycaproic acid.

When an asymmetric carbon atom is present in the molecule, D-isomer and L-isomer can be individually used and a mixture of D- and L-isomers i.e., racemi isomer can also be used.

Further, a mixture of different hydroxycarboxylic acids can be used. For example, a mixture of lactic acid and glycolic acid can be used to form a copolymer.

The reaction of the invention can be carried out in the presence or absence of a catalyst. Reaction velocity can be increased by use of a catalyst. The catalyst which can be used is metals of the group II, III, IV or V in the periodic table, oxide of these metals or salt of these metals. Exemplary catalysts include zinc powder, tin powder, aluminum, magnesium and other metals; tin oxide, antimony oxide, zinc oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride and other metal halides; tin sulfate, zinc sulfate, aluminum sulfate and other metal sulfates; magnesium carbonate, zinc carbonate and other metal carbonates; tin acetate, stannous octoate, tin lactate, zinc acetate, aluminum acetate and other metal organic carboxylates; tin trifluoromethanesulfonate, zinc trifluoromethanesulfonate, magnesium trifluoromethanesulfonate, tin methanesulfonate, tin p-toluenesulfonate and other metal organic sulfonates; dibutyltin oxide and organo metal oxides of other metals above; titanium isopropoxide and metal alkoxides of other metals above; diethylzinc and alkyl metals of other metals above; or ion exchange resins such as Dowex and Amberlite.

The amount of the catalyst is preferably $0.0001 \sim 10\%$ by weight, more preferably $0.001 \sim 2\%$ by weight in view of economy for the weight of hydroxycarboxylic acid or oligomer thereof.

The preparation process of the invention is preferably carried out in an inert atmosphere that is, while replacing with or bubbling an inert gas.

The condensation reaction of the invention can be carried out continuously or batchwise.

In the preparation process of the invention, the reaction can progress while distilling out generated water from the reaction system in combination with the organic solvent. Simultaneously, organic solvent having a water content equal to or less than the solubility of water in the distilled organic solvent can be preferably returned to the reaction system. A preferred embodiment using 90% L-lactic acid (almost all of the residual portion is water) will be described below.

To a reactor equipped with a water separator (for example, Dean Stark trap), a solvent and prescribed amounts of 90% L-lactic acid and catalyst are charged and the mixture is heated. The solvent and water are azeotropically distilled into the water separator. In the initial stage, a large amount of water contained in the L-lactic acid raw material is distilled with the solvent. Water exceeding the solubility in the solvent is separated in the water separator and discharged from the reaction system. Residual solvent having a water content equivalent to the solubility of water is returned to the reactor. In this stage, water contained in the L-lactic acid raw material is almost completely distilled out and L-lactic acid is oligomerized. In this stage, the average molecular weight of the oligomer is $500 \sim 1,000$ and can be increased up to about 5,000, or the oligomer can contain a cyclic dimer, i.e., lactide. The reaction time is from 0.5 to several hours. The oligomerization reaction can be previously carried out in an another reactor in the absence of a solvent and catalyst under reduced pressure, or carried out in the solvent in the absence of a catalyst. Water generated during the reaction is removed from the reaction system at the distilling temperature of the solvent. When the reaction is continued for some dozens of hours while returning the water saturated solvent to the reaction system, poly-L-lactic acid thus obtained has an average molecular weight of $15,000 \sim 50,000$ depending upon the kind of the solvent.

In order to obtain poly-L-lactic acid having a higher molecular weight, a tube packed with molecular sieve or other drying agents is mounted on the reactor in place of the water separator after distilling out most of the water contained in the raw material so as to recycle the distilled solvent through the tube to the reactor. Alternatively, the distilled solvent is treated in an another reaction vessel having a drying agent and successively returned to the reactor, or a new solvent having a low water content is charged to the reactor. When the water content of the solvent is reduced to 50 ppm or less by these methods and the reaction is continued for some dozens of hours, poly-L-lactic acid having an average molecular weight of $50,000 \sim 200,000$ can be obtained.

After finishing the reaction, desired poly-L-lactic acid can be isolated by any known method. For example, the reaction mixture is mixed with methylene chloride and poured into methanol. Precipitated crystals are filtered and dried to obtain the desired poly-L-lactic acid.

The average molecular weight of polyhydroxycarboxylic acid obtained by the process of the invention varies depending upon the kind and amount of the solvent and catalyst, reaction temperature, reaction time and treating methods of azeotropically distilled solvent. The average molecular weight is usually in the range of $15,000 \sim 200,000$. The preparation process of the invention can be conducted by a condensation reaction at decreased temperature and the polyhydroxycarboxylic acid obtained has no problems of discoloration or contamination of impurities formed by thermal decomposition. Polymers of molecular weight 15,000 or more can be used for adhesives and coating materials. These materials have external advantages that no discoloration is found and the desired color can be readily obtained by dyeing. A low content of impurities in the polyhydroxycarboxylic acid is favorable for medical uses such as the matrix of slow release medicines from the standpoint of safety.

It is quite surprising in the process of the invention that polyhydroxycarboxylic acid having an average molecular weight of 50,000 or more can be readily obtained without using cyclic dimers such as lactide. It has been unknown that polyhydroxycarboxylic acid having such a high molecular weight can be directly obtained from the monomer. The high molecular weight polyhydroxycarboxylic acid thus obtained can be processed into films and molded products such as containers which have sufficient strength and toughness. In the case of preparing a film particularly from the polymer obtained by the process of the invention, a polymer having an average molecular weight less than 50,000 ($\eta = 0.40$ dl/g) provides insufficient tensile strength and elongation for a film and hence is difficult to use in the form of a film. Consequently, required average molecular weight of the polymer to be used for a film is 50,000

($\eta=0.40$ dl/g) or more, preferably 70,000 ($\eta=0.57$ dl/g) or more, more preferably 100,000 ($\eta=0.78$ dl/g) or more in view of strength and elongation. According to the preparation process of the invention, a high molecular weight polyhydroxycarboxylic acid which is suitable for use as a film can be obtained with ease. Other processing methods such as blow molding, stretching and vacuum forming can also be applied to the high molecular weight polyhydroxycarboxylic acid. Consequently, the high molecular weight polyhydroxycarboxylic acid obtained by the process of the invention can be used for medical materials and substitutes for conventional general purpose resins used in the form of foams and nets.

In the conventional polyhydroxycarboxylic acid copolymer which is prepared by ring-opening polymerization of cyclic intermediates such as lactide and glycolide (hereinafter referred to as the lactide process), the structural units which constitute the polymer chain are a pair of the same monomer. On the other hand, the polyhydroxycarboxylic acid copolymer by the process of the invention which is a dehydration polycondensation reaction of monomers has a structure wherein a random arrangement of two monomers constitutes the polymer chain.

Figure 2:
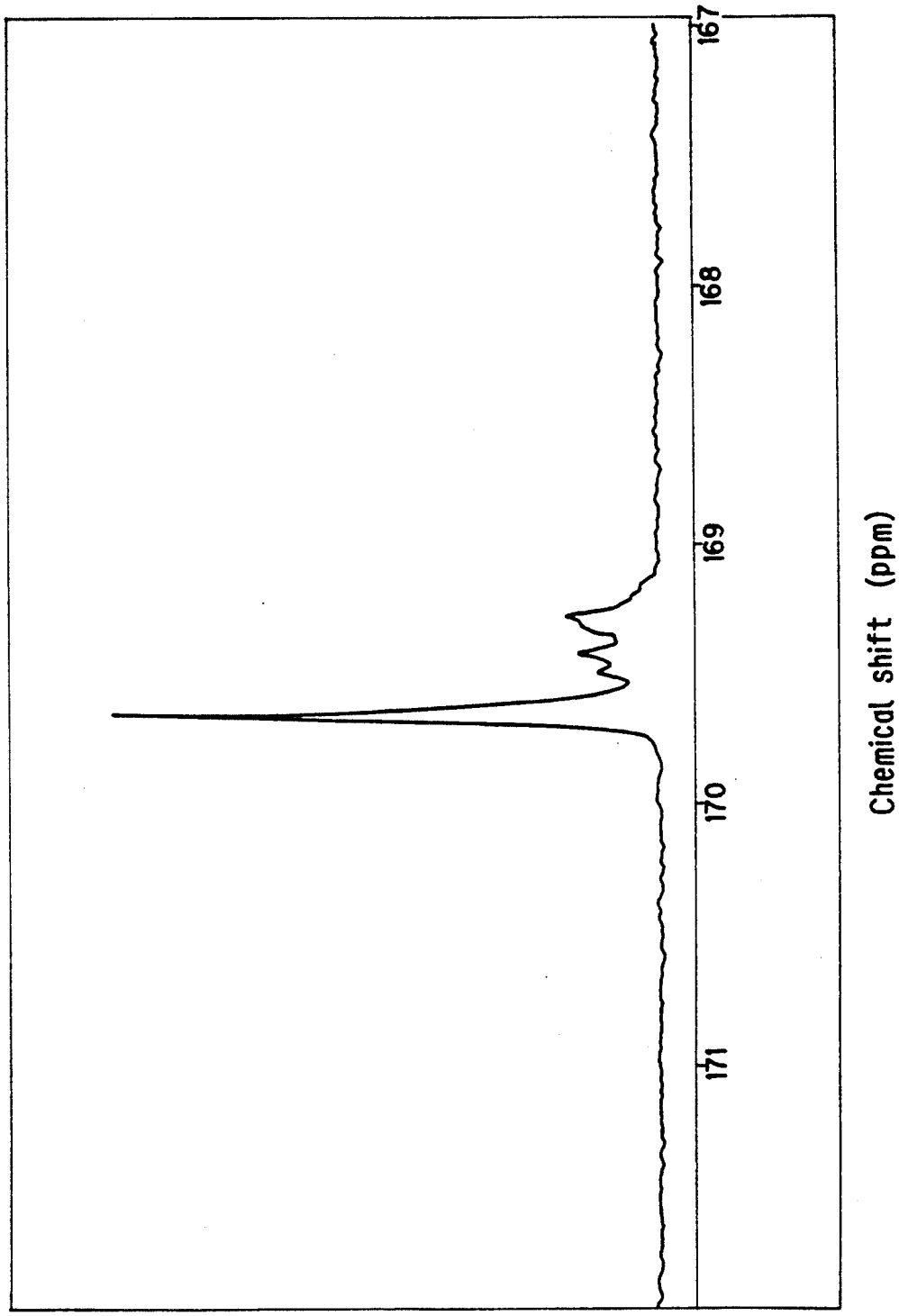
FIG. 2 is a $^{13}$C-NMR spectrum illustrating a carbonyl group of a random copolymer obtained in Example 32 and derived from 90% of L-lactic acid and 10% of D-lactic acid.
Figure 3:
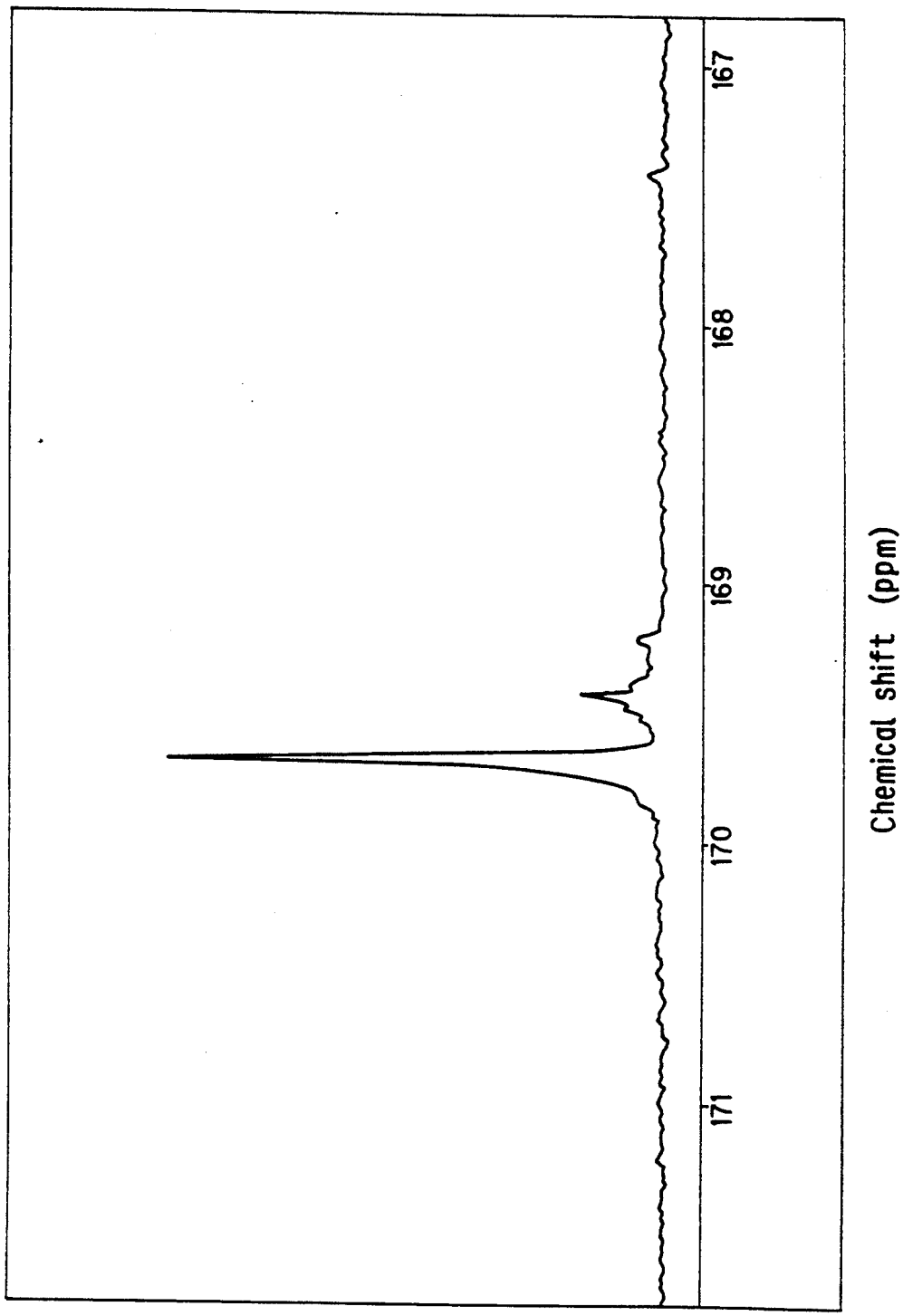
FIG. 3 is a $^{13}$C-NMR spectrum illustrating a carbonyl group of a copolymer obtained in Comparative Example 2 and derived from 90% of L-lactide and 10% D-lactide.
Figure 4:
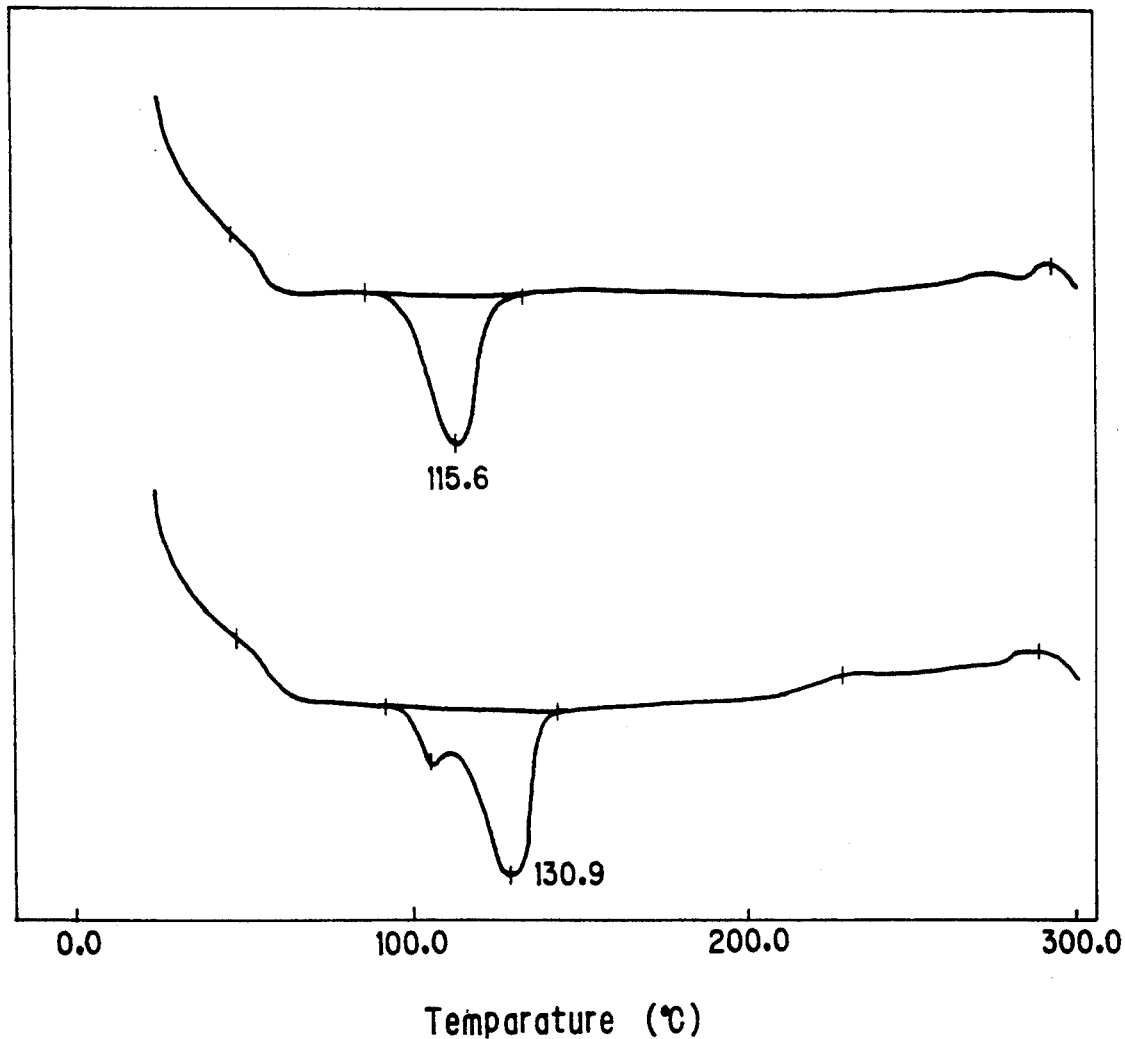
FIG. 4 is a drawing illustrating the results of thermal analyses by DSC. The upper part illustrates results of a thermal analysis on a random copolymer obtained in Example 32 and derived from 90% of L-lactic lactic acid and 10% of D-lactic acid. The lower part illustrates results of a thermal analysis on a copolymer obtained in Comparative Example 2 derived from 90% of L-lactide and 10% of D-lactide.

These two copolymers also differ in physical properties. For example, the random copolymer of D-and L-lactic acid obtained by the preparation process of the invention differs from poly-D, L-lactic acid obtained by the lactide process in $^{13}$C-NMR spectrum pattern of carbonyl group as illustrated in FIG. 1 to FIG. 3. The carbonyl group in the random copolymer of D- and L-lactic acid prepared by the process of the invention exhibits at least 5 characteristic absorption bands at around 169.27, 169.31, 169.42, 169.49 and 169.66 ppm. The random copolymer of D- and L-lactic acid which exhibits such characteristic absorption and has a molecular weight of 50,000 ($\eta=0.40$ dl/g) or more has been prepared for the first time by the process of the invention. As clearly illustrated by thermal analysis data in FIG. 4, the random copolymer of D- and L-lactic acid has a lower melting point as compared with corresponding poly-D, L-lactic acid by the lactide process. As a result, the random copolymer of the invention has practical advantages such as excellent heat-sealing ability and good processability. For example, a random copolymer which is prepared from 10% of D-lactic acid and 90% of L-lactic acid and has a molecular weight of 130,000 ($\eta=0.94$ dl/g) has a melting point of 115.6° C. Corresponding copolymer of the lactide process having a molecular weight of 130,000 ($\eta=0.94$ dl/g) has a melting point of 130.9° C. The lower melting point of the random copolymer leads to practical merits such as good processability and is utilized, for example, for a film having markedly improved heat-sealing ability. When the random copolymer of the invention is used as a soft polymer, the amount of plasticizer can be reduced due to lower melting point and decreased crystallinity.

Further, a random copolymer prepared from 3~25% of D-lactic acid by the process of the invention can be processed into a film having excellent transparency. In this case, the preferred range of D-lactic acid is 5~20%.

The present invention was illustrated in detail by way of examples. However, these examples are not intended to limit the scope of the present invention.

EXAMPLES

In these examples, the water content of the solvent was measured with a Karl Fischer's moisture meter MKC-21 (manufactured by Kyoto Denshi Kogyo Co.).

Example 1

Using a reaction vessel equipped with a Dean Stark trap, 40.2 g of 90% L-lactic acid was azeotropically dehydrated in 400 ml of m-xylene for 2 hours at 138° C. in the presence of 0.1 g of stannous trifluoromethane sulfonate (hereinafter referred to as stannous TFS). After removing distilled water in the Dean Stark trap, a tube packed with 40 g of molecular sieve 3A was mounted on the reactor in place of the Dean Stark trap so as to recycle the distilled solvent through the molecular sieve to the reactor. Azeotropic dehydration was carried out for 40 hours at 138° C. The water content of the solvent was 3 ppm after passing through the molecular sieve. The reaction mixture was concentrated to about a half volume and successively 300 ml of methylene chloride was added and the resulting mixture was poured into 900 ml of methanol. Precipitated crystals were suction filtered, washed with methanol and dried under reduced pressure. White polylactic acid was thus obtained in an amount of 20.3 g (70% yield). Polylactic acid thus formed had an average molecular weight of 60,000.

Example 2

Using a reaction vessel equipped with a Dean Stark trap, 40.2 g of 90% L-lactic acid was azeotropically dehydrated in 200 ml of mesitylene for 2 hours at 163° C. in the presence of 0.1 g of tin metal. After removing distilled water in the Dean Stark trap, a tube packed with 40 g of molecular sieve 5A was mounted on the reactor in place of the Dean Stark trap so as to recycle the distilled solvent through the molecular sieve to the reactor. Azeotropic dehydration was carried out for 20 hours at 163° C. The water content of the solvent was 2 ppm after passing through the molecular sieve. The reaction mixture was concentrated to about a half volume and successively 300 ml of methylene chloride was added and the resulting mixture was suction filtered. The filtrate was poured into 900 ml of methanol. Precipitated crystals were suction filtered, washed with methanol and dried under reduced pressure. White polylactic acid was thus obtained in an amount of 23.1 g (79% yield). Polylactic acid thus formed had an average molecular weight of 60,000.

Example 3

Using a reaction vessel equipped with a Dean Stark trap, 40.2 g of 90% L-lactic acid was azeotropically dehydrated in 85 ml of anisole for 2 hours at 154° C. in the presence of 0.5 g of tin metal. After removing distilled water in the Dean Stark trap, a tube packed with 40 g of molecular sieve 3A was mounted on the reactor in place of the Dean Stark trap so as to recycle the distilled solvent through the molecular sieve to the reactor. Azeotropic dehydration was carried out for 45 hours at 154° C. The water content of the solvent was 1 ppm after passing through the molecular sieve. The reaction mixture was concentrated to about a half volume and successively 300 ml of methylene chloride was added and the resulting mixture was suction filtered. The filtrate was poured into 900 ml of methanol. Precipitated crystals were suction filtered, washed with methanol and dried under reduced pressure. White polylactic acid was thus obtained in an amount of 24.4 g (84% yield). Polylactic acid thus formed had an inherent viscosity of 0.84 and an average molecular weight of 100,000.

Example 4

Using a reactor equipped with a tube packed with 40 g of molecular sieve 3A so as to recycle the distilled solvent through the molecular sieve to the reactor, 40.2 g of 90% L-lactic acid was azeotropically dehydrated for 2 hours at 150° C. under reduced pressure of 40 mmHg in the presence of 0.3 g of tin metal and 30.0 g of lactic acid oligomer that was previously prepared. 300 ml of o-dichlorobenzene was added to the above intact oligomer containing tin metal and azeotropic dehydration was carried out for 45 hours at 130° C. under reduced pressure of 180 mmHg. The water content of the solvent was 1 ppm after passing through the molecular sieve. The reaction mixture was concentrated to a half volume and 300 ml of methylene chloride was added. The resulting mixture was suction filtered and the filtrate was poured into 900 ml of methanol. Precipitated crystals were suction filtered, washed with methanol and dried under reduced pressure. White polylactic acid was thus obtained in an amount of 18.8 g (73% yield). Polylactic acid thus formed had an average molecular weight of 50,000.

Example 5

Using a reaction vessel equipped with a Dean Stark trap, 32.2 g of 90% L-lactic acid and 8.0 g of 90% D,L-lactic acid were azeotropically dehydrated in 85 ml of anisole for 5 hours at 154° C. in the presence of 0.5 g of tin metal. After removing distilled water in the Dean Stark trap, a tube packed with 40 g of molecular sieve 3A was mounted on the reactor in place of the Dean Stark trap so as to recycle the distilled solvent through the molecular sieve to the reactor. Azeotropic dehydration was carried out for 50 hours at 154° C. The water content of the solvent was 1 ppm after passing through the molecular sieve. The reaction mixture was concentrated to about a half volume and successively 300 ml of methylene chloride was added and the resulting mixture was suction filtered. The filtrate was poured into 900 ml of methanol. Precipitated crystals were suction filtered, washed with methanol and dried under reduced pressure. White polylactic acid was thus obtained in an amount of 23.5 g (81% yield). Polylactic acid thus formed had an average molecular weight of 80,000.

Example 6

Using a reaction vessel equipped with a Dean Stark trap, 30.0 g of 90% L-lactic acid and 10.0 g of DL-hydroxybutyric acid were azeotropically dehydrated in 400 ml of mesitylene for 2 hours at 163° C. in the presence of 0.1 g of tin metal. After removing distilled water in the Dean Stark trap, a tube packed with 40 g of molecular sieve 3A was mounted on the reactor in place of the Dean Stark trap so as to recycle the distilled solvent through the molecular sieve to the reactor. Azeotropic dehydration was carried out for 30 hours at 163° C. The water content of the solvent was 2 ppm after passing through the molecular sieve. The reaction mixture was concentrated to about a half volume and successively 300 ml of methylene chloride was added and the resulting mixture was suction filtered. The filtrate was poured into 900 ml of methanol. Precipitated crystals were suction filtered, washed with methanol and dried under reduced pressure. White copolymer was thus obtained in an amount of 23.5 g (78% yield). The copolymer thus formed had an average molecular weight of 50,000.

Example 7

Using a reactor equipped with a tube packed with 40 g of molecular sieve 3A so as to recycle the distilled solvent through the molecular sieve to the reactor, 30.0 g of 90% L-lactic acid and 5.0 g of 4-hydroxy-n-butyric acid were azeotropically dehydrated for 2 hours at 150° C. under reduced pressure of 40 mmHg in the presence of 0.5 g of tin metal and oligomer that was previously prepared. 400 ml of mesitylene was added to the above intact oligomer containing tin metal and azeotropic dehydration was carried out for 25 hours at 163° C. The water content of the solvent was 3 ppm after passing through the molecular sieve. The reaction mixture was concentrated to a half volume and 300 ml of methylene chloride was added. The resulting mixture was suction filtered and the filtrate was poured into 900 ml of methanol. Precipitated crystals were suction filtered, washed with methanol and dried under reduced pressure. White copolymer was thus obtained in an amount of 20.0 g (78% yield). The copolymer thus formed had an average molecular weight of 50,000.

Example 8

By heating 36.0 g of 90% L-lactic acid at 150° C. for 3 hours with stirring under reduced pressure of 50 mmHg while distilling water out of the reaction system. 25.3 g of oligomer was obtained. To the oligomer, 0.088 g of tin powder was added and further stirred at 150° C. for 2 hours under reduced pressure of 30 mmHg. A Dean Stark trap was fitted on the flask and 0.417 g of tin powder and 150 g of acetophenone were added. The resulting mixture was azeotropically dehydrated at 130° C. for 1 hours under reduced pressure of 80 mmHg. After removing distilled water, the Dean Stark trap was replaced by a tube which was packed with 40 g of molecular sieve 3A. Thus, the solvent distilled by refluxing passed through the molecular sieve and returned again to the reaction system. The reaction was carried out at 130° C. for 55 hours under reduced pressure of 80 mmHg. The water content of the solvent was 2 ppm after passing through the molecular sieve. 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 19.4 g (75% yield). Polylactic acid thus formed had an average molecular weight of 70,000.

Example 9

By heating 36.0 g of 90% L-lactic acid at 150° C. for 3 hours with stirring under reduced pressure of 50 mmHg while distilling water out of the reaction system, 25.6 g of oligomer was obtained. To the oligomer, 0.088 g of tin powder was added and further stirred at 150° C. for 2 hours under reduced pressure of 30 mmHg. A Dean Stark trap was fitted on the flask and 0.417 g of tin powder and 150 g of phenetole were added. The resulting mixture was azeotropically dehydrated at 170° C. for 1 hours. After removing distilled water, the Dean Stark trap was replaced by a tube which was packed with 20 g of molecular sieve 3A. Thus, the solvent distilled by refluxing passed through the molecular sieve and returned again to the reaction system. The reaction was carried out at 170° C. for 55 hours. The water content of the solvent was 2 ppm after passing through the molecular sieve. 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 18.6 g (72% yield). Polylactic acid thus formed had an average molecular weight of 75,000.

Example 10

By heating 36.0 g of 90% L-lactic acid at 150° C. for 3 hours with stirring under reduced pressure of 50 mmHg while distilling water out of the reaction system, 25.5 g of oligomer was obtained. To the oligomer, 0.088 g of tin powder was added and further stirred at 150° C. for 2 hours under reduced pressure of 30 mmHg. A Dean Stark trap was fitted on the flask and 0.417 g of tin powder and 150 g of p-dimethoxybenzene were added. The resulting mixture was azeotropically dehydrated at 152° C. for 1 hour under reduced pressure of 135 mmHg. After removing distilled water, the Dean Stark trap was replaced by a tube which was packed with 20 g of molecular sieve 3A. Thus, the solvent distilled by refluxing passed through the molecular sieve and returned again to the reaction system. The reaction was carried out at 152° C. for 50 hours under reduced pressure of 135 mmHg. The water content of the solvent was 2 ppm after passing through the molecular sieve. 170 g of chloroform was added to the reaction mixture and was suction filtered to eliminate tin powder. The chloroform solution was poured into 600 ml of methanol. Precipitated crystal was suction filtered, washed with methanol and successively with hexane and dried at 30° C. under reduced pressure of 5 mmHg. White polylactic acid was thus obtained in an amount of 18.1 g (70% yield). Polylactic acid thus formed had an average molecular weight of 60,000.

Example 11

By heating 36.0 g of 90% L-lactic acid at 150° C. for 3 hours with stirring under reduced pressure of 50 mmHg while distilling water out of the reaction system, 25.5 g of oligomer was obtained. To the oligomer, 0.141 g of stannous chloride was added and further stirred at 150° C. for 2 hours under reduced pressure of 30 mmHg. A Dean Stark trap was fitted on the flask and 0.666 g of stannous chloride and 150 g of 3-methoxytoluene were added. The resulting mixture was azeotropically dehydrated at 175° C. for 1 hour. After removing distilled water, the Dean Stark trap was replaced by a tube which was packed with 20 g of molecular sieve 3A. Thus, the solvent distilled by refluxing passed through the molecular sieve and returned again to the reaction system. The reaction was carried out at 175° C. for 50 hours. The water content of the solvent was 2 ppm after passing through the molecular sieve. 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 19.1 g (74% yield). Polylactic acid thus formed had an average molecular weight of 60,000.

Example 12

By heating 36.0 g of 90% L-lactic acid at 150° C. for 3 hours with stirring under reduced pressure of 50 mmHg while distilling water out of the reaction system, 25.8 g of oligomer was obtained. To the oligomer, 0.112 g of tin oxide was added and further stirred at 150° C. for 2 hours under reduced pressure of 30 mmHg. A Dean Stark trap was fitted on the flask and 0.530 g of tin oxide and 450 g of thioanisole were added. The resulting mixture was azeotropically dehydrated at 130° C. for 1 hour under reduced pressure of 150 mmHg. After removing distilled water, the Dean Stark trap was replaced by a tube which was packed with 20 g of molecular sieve 3A. Thus, the solvent distilled by refluxing passed through the molecular sieve and returned again to the reaction system. The reaction was carried out at 130° C. for 50 hours under reduced pressure of 150 mmHg. The water content of the solvent was 2 ppm after passing through the molecular sieve. 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 18.3 g (71% field). Polylactic acid thus formed had an average molecular weight of 50,000.

Example 13

By heating 36.0 g of 90% L-lactic acid at 150° C. for 3 hours with stirring under reduced pressure of 50 mmHg while distilling water out of the reaction system, 25.9 g of oligomer was obtained. To the oligomer, 0.088 g of tin powder was added and further stirred at 150° C. for 2 hours under reduced pressure of 30 mmHg. 0.417 g of tin powder and 76.0 g of anisole were added and the solvent was distilled at 154° C. while additional anisole dried to a water content of 36 ppm with molecular sieve 3A was added to the mixture. The adding rate and distilling rate were adjusted to be equal at this stage, therefore, 1,800 g of anisole for 130 hours was added to and distilled out of the mixture during the reaction. After the reaction ended, 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 18.1 g (70% yield). Polylactic acid thus formed had an average molecular weight of 70,000.

Example 14

By heating 36.0 g of 90% L-lactic acid at 150° C. for 3 hours with stirring under reduced pressure of 50 mmHg while distilling water out of the reaction system, 25.3 g of oligomer was obtained. To the oligomer, 0.088 g of tin powder was added and further stirred at 150° C. for 2 hours under reduced pressure of 30 mmHg. A Dean Stark trap was fitted on the flask and 0.417 g of tin powder and 75.9 g of diphenyl ether were added. The resulting mixture was azeotropically dehydrated at 130° C. for 1 hour under reduced pressure of 12 mmHg. After removing distilled water, the Dean Stark trap was replaced by a tube which was packed with 20 g of molecular sieve 3A. Thus, the solvent distilled by refluxing passed through the molecular sieve and returned again to the reaction system. The reaction was carried out at 130° C. for 48 hours under reduced pressure of 12 mmHg. The water content of the solvent was 1 ppm after passing through the molecular sieve. 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 21.5 g (83% yield). Polylactic acid thus formed had an average molecular weight of 184,000.

Example 15

By heating 40.2 g of 90% L-lactic acid at 150° C. for 3 hours with stirring under reduced pressure of 50 mmHg while distilling water out of the reaction system, 28.0 g of oligomer was obtained.

To the oligomer, 0.378 of tin powder and 84.0 g of diphenyl ether were added and azeotropic dehydration reaction was carried out at 150° C. for 15 hours under reduced pressure of 35 mmHg. In this reaction step, a tube packed 20 g of molecular sieve 3A was mounted on the reaction flask in such a way that the solvent distilled by refluxing passed through the molecular sieve and returned again to the reaction system. The water content of the solvent was 2 ppm after passing through the molecular sieve. The reaction mixture was suction filtered to eliminate tin powder and concentrated under reduced pressure. White polylactic acid was thus obtained in an amount of 27.2 g (94% yield). Polylactic acid thus formed had an average molecular weight of 133,000.

Example 16

By heating 36.0 g of 90% L-lactic acid at 150° C. for 3 hours with stirring under reduced pressure of 50 mmHg while distilling water out of the reaction system, 25.2 g of oligomer was obtained. To the oligomer, 0.088 of tin powder was added and further stirred at 150° C. for 2 hours under reduced pressure of 30 mmHg. A Dean Stark trap was fitted on the flask and 0.417 g of tin powder, 38.0 g of diphenyl ether and 38.0 g of anisole were added. The resulting mixture was azeotropically dehydrated at 154° C. for 1 hour. After removing distilled water, the Dean Stark trap was replaced by a tube which was packed with 20 g of molecular sieve 4A. Thus, the solvent distilled by refluxing passed through the molecular sieve and returned again to the reaction system. The reaction was carried out at 154° C. for 50 hours. The water content of the solvent was 2 ppm after passing through the molecular sieve. To the reaction mixture, 170 g of chloroform was added, thoroughly mixed and suction filtered to remove tin powder. The filtrate was poured into 600 ml of methanol. Precipitated crystals were suction filtered, washed with methanol and successively washed with hexane and dried at 30° C. under reduced pressure of 5 mmHg. White polylactic acid was thus obtained in an amount of 21.2 g (82% yield). Polylactic acid thus formed has an average molecular weight of 150,000.

Example 17

Two reaction flasks were placed in parallel so as to carry out azeotropic dehydration reaction in one flask and to dry a solvent in another flask. The equipment was installed in such a way that the solvent was evaporated in one flask, cooled, and flowed into another flask so that, the solvent was circulated through the two reaction flasks.

Lactic acid oligomer was previously prepared by stirring lactic acid at 150° C. under reduced pressure of 30 mmHg for 3 hours in the absence of a catalyst. To the azeotropic dehydration flask, 30.0 g of the above oligomer, 0.3 g of tin powder and 90 g diphenyl ether were charged and heated with stirring at 150° C. under reduced pressure of 35 mmHg. To the drying flask 10 g of calcium hydride and 400 g diphenyl ether were charged and heated with stirring at 150° C. for 30 hours under reduced pressure of 35 mmHg. The water content of the solvent was 1 ppm after passing through the molecular sieve. The reaction mixture was mixed with 200 g of chloroform and filtered to remove tin powder. Successively the filtrate was poured into 700 ml of methanol. Precipitated crystals were suction filtered, washed with methanol, washed with hexane and dried at 30° C. under reduced pressure of 5 mmHg. White polylactic acid was obtained in an amount of 23.7 g (82% yield). Polylactic acid thus formed had an average molecular weight of 166,000.

Example 18

Two reaction flasks were placed in parallel so as to carry out azeotropic dehydration reaction in one flask and and to dry a solvent in another flask. The equipment was installed in such a way that the solvent was evaporated in one flask, cooled, and flowed into another flask so that the solvent was circulated through the two reaction flasks.

Lactic acid oligomer was previously prepared by stirring lactic acid at 150° C. under reduced pressure of 30 mmHg for 3 hours in the absence of a catalyst. To the azeotropic dehydration flask, 30.0 g of the above oligomer 0.3 g tin powder and 90 g of diphenyl ether were charged and heated with stirring at 150° C. under reduced pressure of 35 mmHg to the reaction flask, 10 g of phosphorus pentaoxide and 400 g diphenyl ether were charged and heated with stirring at 150° C. under reduced pressure of 35 mmHg. The water content of the solvent was 3 ppm after passing through the molecular sieve. The reaction mixture was mixed with 200 g of chloroform and filtered to remove tin powder.

Successively the filtrate was poured into 700 ml of methanol. Precipitated crystals were suction filtered washed with methanol, washed with hexane and dried at 30° C. under reduced pressure of 5 mmHg. White polylactic acid was thus obtained in an amount of 22.8 g (79% yield). Polylactic acid thus formed had an average molecular weight of 120,000.

Example 19

By heating 36.0 g 90% L-lactic acid and 9.0 g of 90% D, L-lactic acid at 150° C. for 3 hours with stirring under reduced pressure of 50 mmHg while distilling water out of the reaction system. 31.6 g of oligomer was obtained.

To the oligomer, 0.158 g of tin powder was added and further stirred at 150° C. for 2 hours under reduced pressure of 30 mmHg. A Dean Stark trap was fitted on the flask and 0.743 g of tin powder and 95.0 g of diphenyl ether were added. The resulting mixture was azeotropically dehydrated at 150° C. for 1 hour under reduced pressure of 35 mmHg. After removing distilled water, the Dean Stark trap was replaced by a tube which was packed with 25 g of molecular sieve 3A. Thus the solvent distilled by refluxing passed through the molecular sieve and returned again to the reaction system. The reaction was carried out at 150° C. for 40 hours under reduced pressure of 35 mmHg. The water content of the solvent was 2 ppm after passing through the molecular sieve. To the reaction mixture 220 g of chloroform was added thoroughly mixed and suction filtered to remove tin powder. The filtrate was poured into 750 ml of methanol. Precipitated crystals were suction filtered, washed with methanol and successively washed with hexane and dried at 30° C. under reduced pressure of 5 mmHg. White polylactic acid was thus obtained in an amount of 26.9 g (83% yield). Polylactic acid thus formed had an average molecular weight of 160,000.

Example 20

By heating 32.4 g of 90% L-lactic acid and 3.9 g of 70% glycolic acid at 150° C. for 3 hours with stirring under reduced pressure of 50 mmHg while distilling water out of the reaction system, 27.4 g of oligomer was obtained.

To the oligomer, 0.158 g of tin powder was added and further stirred at 150° C. for 2 hours under reduced pressure of 30 mmHg. A Dean Stark trap was fitted on the flask and 0.743 g of tin powder and 95.0 g of diphenyl ether were added. The resulting mixture was azeotropically dehydrated at 150° C. for 1 hour under reduced pressure of 35 mmHg. After removing distilled water, the Dean Stark trap was replaced by a tube which was packed with 25 g of molecular sieve 3A. Thus solvent distilled by refluxing passed through the molecular sieve and returned again to the reaction system. The reaction was carried out at 150° C. for 40 hours under reduced pressure of 35 mmHg. The water content of the solvent was 2 ppm after passing through the molecular sieve. To the reaction mixture 220 g of chloroform was added, thoroughly mixed and suction filtered to remove tin powder. The filtrate was poured into 750 ml of methanol. Precipitated crystals were suction filtered, washed with methanol and successively washed with hexane and dried at 30° C. under reduced pressure of 5 mmHg. White copolymer was thus obtained in an amount of 21.5 g (83% yield). Copolymer thus formed had an average molecular weight of 140,000.

Example 21

By heating 32.4 g of 90% L-lactic acid and 3.75 g of DL-3-hydroxy-n-butyric acid at 150° C. for 3 hours with stirring under reduced pressure of 50 mmHg while distilling water out of the reaction system, 27.4 g of oligomer was obtained.

To the oligomer, 0.158 g of tin powder was added and further stirred at 150° C. for 2 hours under reduced pressure of 30 mmHg. A Dean Stark trap was fitted on the flask and 0.743 g of tin powder and 95.0 g of diphenyl ether were added. The resulting mixture was azeotropically dehydrated at 150° C. for 1 hour under reduced pressure of 35 mmHg. After removing distilled water, the Dean Stark trap was replaced by a tube which was packed with 25 g of molecular sieve 3A. Thus solvent distilled by refluxing passed through the molecular sieve and returned again to the reaction system. The reaction was carried out at 150° C. for 40 hours under reduced pressure of 35 mmHg. The water content of the solvent was 2 ppm after passing through the molecular sieve. To the reaction mixture 220 g of chloroform was added, thoroughly mixed and suction filtered to remove tin powder. The filtrate was poured into 750 ml of methanol. Precipitated crystals were suction filtered, washed with methanol and successively washed with hexane and dried at 30° C. under reduced pressure of 5 mmHg. White copolymer was thus obtained in an amount of 22.0 g (85% yield). Copolymer thus formed had an average molecular weight of 100,000.

Example 22

By heating 32.4 g of 90% L-lactic acid and 3.75 g of 4-hydroxy-n-butyric acid at 150° C. for 3 hours with stirring under reduced pressure of 50 mmHg while distilling water out of the reaction system, 27.4 g of oligomer was obtained. To the oligomer, 0.158 g of tin powder was added and further stirred at 150° C. for 2 hours under reduced pressure of 30 mmHg. A Dean Stark trap was fitted on the flask and 0.743 g of tin powder and 95.0 g of diphenyl ether were added. The resulting mixture was azeotropically dehydrated at 150° C. for 1 hour under reduced pressure of 35 mmHg. After removing distilled water, the Dean Stark trap was replaced by a tube which was packed with 25 g of molecular sieve 3A. Thus the solvent distilled by refluxing passed through the molecular sieve and returned again to the reaction system. The reaction was carried out at 150° C. for 40 hours under reduced pressure of 35 mmHg. The water content of the solvent was 2 ppm after passing through the molecular sieve. To the reaction mixture 220 g of chloroform was added, thoroughly mixed and suction filtered to remove tin powder. The filtrate was poured into 750 ml of methanol. Precipitated crystals were suction filtered, washed with methanol and successively washed with hexane and dried at 30° C. under reduced pressure of 5 mmHg. White copolymer was thus obtained in an amount of 21.0 g (81% yield). Copolymer thus formed had an average molecular weight of 105,000.

Example 23

By heating 43.8 g of 90% L-lactic acid at 150° C. for 3 hours with stirring under reduced pressure of 50 mmHg while distilling water out of the reaction system, 30.7 g of oligomer was obtained.

To the oligomer, 0.108 g of tin powder was added and further stirred at 150° C. for 2 hours under reduced pressure of 30 mmHg. A Dean Stark trap was fitted on the flask and 0.510 g of tin powder and 92.2 g of 3-phenoxytoluene were added. The resulting mixture was azeotropically dehydrated at 150° C. for 2 hours under reduced pressure of 20 mmHg. After removing distilled water, the Dean Stark trap was replaced by a tube which was packed with 20 g of molecular sieve 3A. Thus the solvent distilled by refluxing passed through the molecular sieve and returned again to the reaction system. The reaction was carried out at 150° C. for 40 hours under reduced pressure of 20 mmHg. The water content of the solvent was 2 ppm after passing through the molecular sieve. To the reaction mixture 200 g of chloroform was added, thoroughly mixed and suction-filtered to remove tin powder. The filtrate was poured into 700 ml of methanol. Precipitated crystals were suction-filtered, washed with methanol and successively washed with hexane and dried at 30° C. under reduced pressure of 5 mmHg. White polylactic acid was thus obtained in an amount of 26.2 g (83% yield). Polylactic acid thus formed had an average molecular weight of 150,000.

Example 24

By heating 43.8 g of 90% L-lactic acid at 150° C. for 3 hours with stirring under reduced pressure of 50 mmHg while distilling water out of the reaction system, 30.7 g of oligomer was obtained.

To the oligomer, 0.108 g of tin powder was added and further stirred at 150° C. for 2 hours under reduced pressure of 30 mmHg. A Dean Stark trap was fitted on the flask and 0.510 g of tin powder and 92.2 g of 4-bromodiphenyl ether were added. The resulting mixture was azeotropically dehydrated at 150° C. for 2 hours under reduced pressure of 6 mmHg. After removing distilled water, the Dean Stark trap was replaced by a tube which was packed with 20 g of molecular sieve 3A. Thus solvent distilled by refluxing passed through the molecular sieve and returned again to the reaction system. The reaction was carried out at 150° C. for 40 hours under reduced pressure of 6 mmHg. The water content of the solvent was 2 ppm after passing through the molecular sieve. To the reaction mixture 200 g of chloroform was added thoroughly mixed and suction-filtered to remove tin powder. The filtrate was poured into 700 ml of methanol. Precipitated crystals were suction-filtered, washed with methanol and successively washed with hexane and dried at 30° C. under reduced pressure of 5 mmHg. White polylactic acid was thus obtained in an amount of 25.6 g (81% yield). Polylactic acid thus formed had an average molecular weight of 140,000.

Example 25

By heating 43.8 g of 90% L-lactic acid at 150° C. for 3 hours with stirring under reduced pressure of 50 mmHg while distilling water out of the reaction system, 30.7 g of oligomer was obtained.

To the oligomer, 0.108 g of tin powder was added and further stirred at 150° C. for 2 hours under reduced pressure of 30 mmHg. A Dean Stark trap was fitted on the flask and 0.510 g of tin powder and 92.2 g of dibenzofuran were added. The resulting mixture was azeotropically dehydrated at 154° C. for 2 hours under reduced pressure of 20 mmHg. After removing distilled water, the Dean Stark trap was replaced by a tube which was packed with 20 g of molecular sieve 3A. Thus the solvent distilled by refluxing passed through the molecular sieve and returned again to the reaction system. The reaction was carried out at 154° C. for 40 hours under reduced pressure of 20 mmHg. The water content of the solvent was 2 ppm after passing through the molecular sieve. To the reaction mixture 200 g of chloroform was added, thoroughly mixed and suction-filtered to remove tin powder. The filtrate was poured into 700 ml of methanol. Precipitated crystals were suction-filtered, washed with methanol and successively washed with hexane and dried at 30° C. under reduced pressure of 5 mmHg. White polylactic acid was thus obtained in an amount of 26.2 g (83% yield). Polylactic acid thus formed had an average molecular weight of 150,000.

Example 26

By heating 43.8 g of 90% L-lactic acid at 150° C. for 3 hours with stirring under reduced pressure of 50 mmHg while distilling water out of the reaction system, 30.7 g of oligomer was obtained.

To the oligomer, 0.173 g of stannous chloride was added and further stirred at 150° C. for 2 hours under reduced pressure of 30 mmHg. A Dean Stark trap was fitted on the flask and 0.816 g of stannous chloride and 92.2 g of diphenyl ether were added. The resulting mixture was azeotropically dehydrated at 130° C. for 2 hours under reduced pressure of 12 mmHg. After removing distilled water, the Dean Stark trap was replaced by a tube which was packed with 20 g of molecular sieve 3A. Thus the solvent distilled by refluxing passed through the molecular sieve and returned again to the reaction system. The reaction was carried out at 130° C. for 40 hours under reduced pressure of 12 mmHg. The water content of the solvent was 2 ppm after passing through the molecular sieve. To the reaction mixture 200 g of chloroform was added, thoroughly mixed and suction-filtered to remove tin powder. The filtrate was poured into 700 ml of methanol. Precipitated crystals were suction-filtered, washed with methanol and successively washed with hexane and dried at 30° C. under reduced pressure of 5 mmHg. White polylactic acid was thus obtained in an amount of 24.9 g (79% yield). Polylactic acid thus formed had an average molecular weight of 110,000.

Example 27

By heating 43.8 g of 90% L-lactic acid at 150° C. for 3 hours with stirring under reduced pressure of 50 mmHg while distilling water out of the reaction system, 30.7 g of oligomer was obtained.

To the oligomer, 0.386 g of stannous octoate was added and further stirred at 150° C. for 2 hours under reduced pressure of 30 mmHg. A Dean Stark trap was fitted on the flask and 1.821 g of stannous octoate and 92.2 g of diphenyl ether were added. The resulting mixture was azeotropically dehydrated at 130° C. for 2 hours under reduced pressure of 12 mmHg. After removing distilled water, the Dean Stark trap was replaced by a tube which was packed with 20 g of molecular sieve 3A. Thus the solvent distilled by refluxing passed through the molecular sieve and returned again to the reaction system. The reaction was carried out at 130° C. for 55 hours under reduced pressure of 12 mmHg. The water content of the solvent was 2 ppm after passing through the molecular sieve. To the reaction mixture 200 g of chloroform was added, thoroughly mixed and suction-filtered to remove tin powder. The filtrate was poured into 700 ml of methanol. Precipitated crystals were suction-filtered, washed with methanol and successively washed with hexane and dried at 30° C. under reduced pressure of 5 mmHg. White polylactic acid was thus obtained in an amount of 23.9 g (76% yield). Polylactic acid thus formed had an average molecular weight of 70,000.

Example 28

36.0 g of 90% L-lactic acid and 0.505 g of tin powder in 76.0 g of diphenyl ether solvent were heated at 130° C. for 5 hours with stirring under reduced pressure of 100 mmHg while distilling water out of the reaction system. Then, additional diphenyl ether dried to water content of 10 ppm with molecular sieve 3A was added and distilled at 130° C. under reduced pressure of 12 mmHg to the reaction system. The adding rate and distilling rate were adjusted to be equal at this stage, therefore, 3,900 g of diphenyl ether for 130 hours was added to and distilled out of the mixture during the reaction. After the reaction ended, 170 g of chloroform was added to the reaction mixture and was suction filtered to eliminate tin powder. The chloroform solution was poured into 600 ml of methanol. Precipitated crystals were suction filtered, washed with methanol and successively with hexane and dried at 30° C. under reduced pressure of 5 mmHg. White polylactic acid was thus obtained in an amount of 19.4 g (75% yield). Polylactic acid thus formed had an average molecular weight of 100,000.

Example 29

By heating 43.8 g of 90% L-lactic acid at 150° C. for 3 hours with stirring under reduced pressure of 50 mmHg while distilling water out of the reaction system, 30.7 g of oligomer was obtained.

To the oligomer, 0.108 g of tin powder was added and further stirred at 150° C. for 2 hours under reduced pressure of 30 mmHg. A Dean Stark trap was fitted on the flask and 0.510 g of tin powder and 92.2 g of diphenyl ether were added. The resulting mixture was azeotropically dehydrated at 150° C. for 2 hours under reduced pressure of 35 mmHg. After removing distilled water, the Dean Stark trap was replaced by a tube which was packed with 20 g of molecular sieve 3A. Thus the solvent distilled by refluxing passed through the molecular sieve and returned again to the reaction system. The reaction was carried out at 150° C. for 40 hours under reduced pressure of 35 mmHg. The water content of the solvent was 1 ppm after passing through the molecular sieve. To the reaction mixture 200 g of chloroform was added, thoroughly mixed and suction filtered to remove tin powder. The filtrate was poured into 700 ml of methanol. Precipitated crystal was suction filtered, washed with methanol and successively washed with hexane and dried at 30° C. under reduced pressure of 5 mmHg. White polylactic acid was thus obtained in an amount of 26.8 g (85% yield). Polylactic acid thus formed had an average molecular weight of 147,000.

Example 30

Using a reactor equipped with a Dean Stark trap, 40.2 g of 90% L-lactic acid was subjected to azeotropic dehydration for 40 hours in 400 ml of m-xylene in the presence of 0.1 g of tin TFS. Final water content of m-xylene which recycled between the Dean Stark trap and the reactor was 439 ppm. The reaction mixture was concentrated to a half volume and mixed with 300 ml of methylene chloride and poured into 900 ml of methanol. Precipitated crystals were suction filtered, washed with methanol and dried under reduced pressure. White polylactic acid was thus obtained in an amount of 11.6 g (40% yield) and has an average molecular weight of 15,000.

Example 31

An amount of 36.0 g of 90% L-lactic acid was heated for 3 hours with stirring at 150° C. under reduced pressure of 50 mmHg while distilling water out of the reaction system to obtain 25.3 g of oligomer. To the oligomer, 0.088 g of tin powder was added and the stirring further continued for 2 hours at 150° C. under reduced pressure of 30 mmHg.

A Dean Stark trap was fitted on the reactor, 0.417 g of tin powder and 75.9 g diphenyl ether were added, and an azeotropic dehydration reaction was carried was carried out for 30 hours at 130° C. under reduced pressure of 12 mmHg while removing water separated in the trap. The solvent returning to the reactor after removing water has a water content of 450 ppm. The reaction mixture was mixed with 600 g of chloroform and suction filtered to remove tin powder. The filtrate was poured into 600 ml of methanol. Precipitated crystals were suction filtered, washed with methanol and successively with hexane and dried at 30° C. under reduced pressure of 5 mmHg. White polylactic acid was thus obtained in an amount of 18.7 g (72% yield) and had an average molecular weight of 48,000.

Comparative Example 1

An amount of 43.8 g of 90% L-lactic acid was heated with stirring at 150° C. for 3 hours under reduced pressure of 50 mmHg while distilling water out of the reaction system to obtain 30.7 g of oligomer. The oligomer was mixed with 0.108 g tin powder and further stirred for 2 hours at 150° C. under reduced pressure of 30 mmHg. Thereafter 0.510 g of tin powder was added, and a dehydration reaction was carried out at 150° C. for 30 hours at reduced pressure of 1 mmHg. The reaction mixture was mixed with 170 g chloroform and suction filtered to remove tin powder. The filtrate was poured into 600 ml of methanol. Precipitated crystals were suction filtered, washed with methanol and successively with hexane and dried at 30° C. under reduced pressure of 5 mmHg. Polylactic acid was thus obtained in an amount of 11.4 g (36% yield) and had an average molecular weight of 8,000.

Reference Example 1

Poly-L-lactic acid which was obtained in Example 3 and had an average molecular weight of 100,000 was dissolved in chloroform. A film was prepared from the chloroform solution by casting. The film had the following physical properties.
Thickness: 36~37 μm
Tensile strength at yield point: 510 Kg/cm$^2$
Tensile strength at break: 510 Kg/cm$^2$
Elongation: 6%

Reference Example 2

Poly-L-lactic acid which was obtained in Example 9 and had an average molecular weight of 75,000 was dissolved in chloroform. A film was prepared from the chloroform solution by casting. The film was colorless and had the following physical properties.
Thickness: 38~39 μm
Tensile strength at yield point: 450 Kg/cm$^2$
Tensile strength at break: 450 Kg/cm$^2$
Elongation: 3%

Reference Example 3

Poly-L-lactic acid which was obtained in Example 10 and had an average molecular weight of 60,000 was dissolved in chloroform. A film was prepared from the chloroform solution by casting. The film was colorless and had the following physical properties.
Thickness: 39~40 μm
Tensile strength at yield point: 220 Kg/cm$^2$
Tensile strength at break: 220 Kg/cm$^2$
Elongation: 3%

Reference Example 4

Poly-L-lactic acid which was obtained in Example 18 and had an average molecular weight of 120,000 was dissolved in chloroform. A film was prepared from the chloroform solution by casting. The film was colorless and had the following physical properties.
Thickness: 33~36 μm
Tensile strength at yield point: 510 Kg/cm$^2$
Tensile strength at break: 430 Kg/cm$^2$
Elongation: 13~20%

Reference Example 5

Poly-L-lactic acid which was obtained in Example 29 and had an average molecular weight of 147,000 was dissolved in chloroform. A film was prepared from the chloroform solution by casting. The film was colorless and had the following physical properties.

Thickness: 42~50 μm

Tensile strength at yield point: 600 Kg/cm$^2$

Tensile strength at break: 560 Kg/cm$^2$
Elongation: 11%

Reference Example 6

A chloroform solution containing poly-L-lactic acid obtained in Example 29 and triacetin plasticizer in a ratio of 4:1 by weight was prepared. A film was prepared from the chloroform solution by casting. The film was colorless and had the following physical properties.
Thickness: 37~40 μm
Tensile strength at yield point: 340 Kg/cm$^2$
Tensile strength at break: 310 Kg/cm$^2$
Elongation: 30%

Reference Example 7

Polylactic acid which was obtained in Example 30 and had an average molecular weight of 15,000 was dissolved in chloroform.

The chloroform solution was cast in order to prepare a film. However, the film could not be formed.

Example 32

Oligomerization and polymerization were carried out by the same procedures as described in Example 19 except that 36.0 g of 90% L-lactic acid and 9.0 g of 90% D, L-lactic acid were used and the reaction was carried out for 20 hours. The reaction mixture was mixed with 220 g chloroform and suction filtered to remove tin powder. The filtrate was washed with 100 ml of 1N hydrochloric acid, further washed twice with 100 ml of water, and poured into 750 ml of methanol. Precipitated solids were suction filtered, washed with methanol and successively with hexane, and dried at 30° C. under reduced pressure of 5 mmHg. Polylactic acid was thus obtained in an amount of 28.9 g (89% yield) and had an average molecular weight of 130,000.

A $^{13}$C-NMR analysis of the polymer obtained was carried out by using deuteride chloroform as a solvent. FIG. 1 illustrates an overall diagram. FIG. 2 illustrates enlarged signals of carbonyl carbon. The polymer of the invention is characterized by having at least 5 signals at around 169.27, 169.31, 169.42, 169.49 and 169.66 ppm. Results of differential scanning calorimetry (DSC) are illustrated in the upper part of FIG. 4. The polymer obtained in Example 32 by the process of the invention has a heat absorption peak at 115.6° C. which corresponds to the melting point.

Comparative Example 2

In a thick-walled, cylindrical stainless steal polymerization vessel equipped with a stirrer, 172 g (1.2 moles) of L-lactide, 44 g (0.3 mole) of D,L-lactide, 0.01% by weight of stannous octoate and 0.03% by weight of lauryl alcohol were sealed. The polymerization vessel was deaerated under vacuum for 2 hours and replaced by nitrogen gas. The mixture was heated with stirring at 200° C. for 3 hours under a nitrogen atmosphere. While maintaining the mixture at the same temperature, the polymerization vessel was gradually evacuated to the reduced pressure of 3 mmHg through an exhaust tube and glass receiver with a vacuum pump. After an hour from the start of evacuation, distillation of monomers and low molecular weight volatiles was terminated. The vessel was filled with nitrogen and the polymer was discharged from the bottom of the vessel in the form of a strand. The strand was pelletized to obtain white poly-L-lactic acid in a yield of 96%. The polymer had an average molecular weight of 130,000.

A $^{13}$C-NMR analysis of the polymer obtained was carried out by using deuteride chloroform as a solvent. FIG. 3 illustrates enlarged signals of carbonyl carbon. These signals have remarkably different patterns as compared with the signals of the polymer obtained in Example 32. Carbonyl carbon of the polymer obtained in Example 32 has at least 5 signals at around 169.27, 169.31, 169.42, 169.49 and 169.66 ppm. On the other hand, carbonyl carbon of the polymer prepared from lactide in Comparative Example 2 has 5 signals at around 169.20, 169.36, 169.40, 169.45 and 169.66 ppm. Thus, these two carbonyl carbons can be distinguished with ease. Results of differential scanning calorimetry are illustrated in the lower part of FIG. 4. The polymer obtained in Example 32 by the process of the invention has a heat absorption peak at 115.6° C. which corresponds to the melting point. On the other hand, the polymer obtained in Comparative Example 2 has a main heat absorption peak at 130.9° C., which indicates a higher melting point.

Reference Example 8

The polymer which was obtained in Example 32 and had an average molecular weight of 130,000 and a heat absorption peak corresponding to the melting point at 115.6° C. was processed into films having dimensions of 150 mm×150 mm and thickness of 40 μm. A welding test was carried out by overlapping two films and pressing between two hot plates having a width of 5 mm. The films could be welded by pressing for 0.5 second at a hot plate temperature of 102° C. under a pressure of 0.5 Kg/cm$^2$.

Reference Example 9

The polymer which was obtained in Comparative Example 2 and had an average molecular weight of 130,000 and a main heat absorption peak at 130.9° C. was processed into films having dimensions of 150 mm×150 mm and thickness of 40 μm. A welding test was carried out by the same process as Reference Example 8. The films could not be welded by pressing for 0.5 seconds at a hot plate temperature of 102° C. under a pressure of 0.5 Kg/cm$^2$. A hot plate temperature of 115° C. was required in order to weld the two films by pressing for 0.5 seconds under a pressure of 0.5 Kg/cm$^2$.

What is claimed is:

1. A process for preparing polyhydroxycarboxylic acid comprising conducting dehydration condensation of a hydroxycarboxylic acid or an oligomer thereof in a reaction mixture containing an organic solvent and less than 500 ppm of water to obtain polyhydroxycarboxylic acid having a weight average molecular weight of at least about 15,000.

2. The process of claim 1 wherein the weight average molecular weight is at least about 50,000.

3. The process of claim 1 wherein the weight average molecular weight is at least about 70,000.

4. The process of claim 1 wherein the weight average molecular weight is at least about 100,000.

5. The process of claim 1 wherein at least a portion of the organic solvent is removed from the reaction mixture and additional solvent is added to the reaction mixture that has a water content which is equal to or less than the water content of the organic solvent removed from the reaction mixture.

6. The process of claim 5 wherein the portion of the organic solvent removed from the reaction mixture is contacted with a drying agent to reduce the water content and is returned to the reaction mixture as the additional solvent.

7. The process of claim 6 wherein the drying agent is a molecular sieve, phosphorus pentaoxide or metal hydrides.

8. The process of claim 7 wherein the drying agent is a molecular sieve.

9. The process of claim 5 wherein the additional solvent added to the reaction mixture has a water content of not more than 50 ppm.

10. The process of claim 5 wherein the reaction mixture is first azeotropically distilled to remove water and then said portion of the organic solvent is removed from the reaction mixture.

11. The process of claim 1 wherein the organic solvent is selected from hydrocarbon solvents, halogenated solvents, ketone solvents or ether solvents.

12. The process of claim 11 wherein the organic solvent is an ether solvent.

13. The process of claim 12 wherein the organic solvent is anisole or phenetole.

14. The process of claim 1 wherein the organic solvent is a diphenyl ether solvent.

15. The process of claim 14 wherein the organic solvent is diphenyl ether.

16. The process of claim 1 wherein the hydroxycarboxylic acid is lactic acid.

17. The process of claim 16 wherein the lactic acid is a mixture of D- and L-lactic acid.

18. The process of claim 1 wherein the hydroxycarboxylic acid is a mixture of hydroxycarboxylic acids and includes lactic acid.

19. The process of claim 18 wherein the mixture includes lactic acid and glycolic acid.

20. The polyhydroxycarboxylic acid made by the process of claim 1.

21. The polyhydroxycarboxylic acid made by the process of claim 5.

22. The polyhydroxycarboxylic acid made by the process of claim 10.

23. The polyhydroxycarboxylic acid made by the process of claim 15.

24. The polyhydroxycarboxylic acid made by the process of claim 17.

25. The polyhydroxycarboxylic acid made by the process of claim 19.

26. A degradable polyhydroxycarboxylic acid prepared directly from a reaction mixture consisting essentially of a hydroxycarboxylic acid or a oligomer thereof, organic solvent and less than 500 ppm of water, said polyhydroxycarboxylic acid having a weight average molecular weight of at least about 50,000.

27. The polyhydroxycarboxylic acid of claim 26 having a weight average molecular weight of at least about 70,000.

28. The polyhydroxycarboxylic acid of claim 26 having a weight average molecular weight of at least about 100,000.

29. The polyhydroxycarboxylic acid of claim 26 wherein the hydroxycarboxylic acid is lactic acid.

30. The polyhydroxycarboxylic acid of claim 26 wherein the hydroxycarboxylic acid is a mixture comprised of D- and L-lactic acid.

31. A degradable polyhydroxycarboxylic acid consisting essentially of D- and L-lactic acid, having $^{13}$C-NMR absorbance of around 169.27 ppm, 169.31 ppm, 169.42 ppm, 169.49 ppm and 169.66 ppm.

32. The polyhydroxycarboxylic acid of claim 26 wherein the hydroxycarboxylic acid is a mixture of hydroxycarboxylic acids and includes lactic acid.

33. The polyhydroxycarboxylic acid of claim 26 wherein the hydroxycarboxylic acid is a mixture of lactic acid and glycolic acid.

34. The polyhydroxycarboxylic acid of claim 26 wherein the polyhydroxycarboxylic acid is transparent.

35. The polyhydroxycarboxylic acid of claim 31 wherein the polyhydroxycarboxylic acid has a weight average molecular weight of at least about 50,000.

36. The polyhydroxycarboxylic acid of claim 31 wherein the polyhydroxycarboxylic acid has a weight average molecular weight of at least about 70,000.

37. The polyhydroxycarboxylic acid of claim 31 wherein the polyhydroxycarboxylic acid has a weight average molecular weight of at least about 100,000.

* * * * *